(12) United States Patent
Tazaki et al.

(10) Patent No.: US 7,164,140 B2
(45) Date of Patent: Jan. 16, 2007

(54) STIMULABLE PHOSPHOR PANEL AND METHOD OF PRODUCING STIMULABLE PHOSPHOR PANEL

(75) Inventors: Seiji Tazaki, Kanagawa (JP); Yuichi Hosoi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 97 days.

(21) Appl. No.: 11/094,213

(22) Filed: Mar. 31, 2005

(65) Prior Publication Data

US 2005/0218340 A1   Oct. 6, 2005

(30) Foreign Application Priority Data

Mar. 31, 2004   (JP) ............................. 2004-105090

(51) Int. Cl.
*G03B 42/08* (2006.01)

(52) U.S. Cl. ................................ 250/484.4; 250/484.2

(58) Field of Classification Search ............. 250/484.4, 250/484.2
See application file for complete search history.

(56) References Cited

U.S. PATENT DOCUMENTS

| 5,023,461 | A | 6/1991 | Nakazawa et al. | |
|---|---|---|---|---|
| 2002/0066868 | A1* | 6/2002 | Shoji et al. | 250/484.4 |
| 2003/0066972 | A1* | 4/2003 | Leblans et al. | 250/484.4 |
| 2003/0071228 | A1* | 4/2003 | Bergh et al. | 250/484.4 |
| 2003/0160185 | A1* | 8/2003 | Homme | 250/483.1 |
| 2005/0023494 | A1* | 2/2005 | Okada et al. | 250/581 |
| 2005/0139783 | A1* | 6/2005 | Kubota et al. | 250/484.4 |
| 2006/0065861 | A1* | 3/2006 | Tazaki | 250/580 |

FOREIGN PATENT DOCUMENTS

| JP | 5-249299 A | 9/1993 |
|---|---|---|
| JP | 2677822 B2 | 11/1997 |
| JP | 2789194 B2 | 6/1998 |
| JP | 2886165 B2 | 4/1999 |

* cited by examiner

*Primary Examiner*—Albert Gagliardi
(74) *Attorney, Agent, or Firm*—Sughrue Mion, PLLC (57) ABSTRACT

The stimulable phosphor panel includes a support having a substrate or the substrate and a sealing member, a stimulable phosphor layer formed on the substrate being the support through gas phase deposition, a moisture-proof protective layer for sealing the stimulable phosphor layer and a sealing adhesive layer for bonding an outer periphery of the moisture-proof protective layer to the support. The sealing adhesive layer has a moisture permeability of 1,000 $g/m^2 \cdot day$ or less as an adhesive after curing, a width of 2 mm to 10 mm, and a thickness of 0.5 μm to 20 μm. The producing method forms the stimulable phosphor layer on the support through gas phase deposition, forms the adhesive layer and bonds the moisture-proof protective layer to the support through the adhesive layer. The stimulable phosphor panel is capable of preventing deterioration of its characteristics due to moisture absorption over a long period of time.

20 Claims, 3 Drawing Sheets

STIMULABLE PHOSPHOR PANEL AND METHOD OF PRODUCING STIMULABLE PHOSPHOR PANEL

This application claims priority on Japanese patent application No.2004-105090, the entire contents of which are hereby incorporated by reference.

BACKGROUND OF THE INVENTION

The present invention relates to a field of stimulable phosphor panel technology. In particular, the present invention relates to a high quality stimulable phosphor panel having a stimulable phosphor layer without deterioration of characteristics due to moisture absorption, and to a method of producing the stimulable phosphor panel.

There are known a class of phosphors which accumulate a portion of applied radiations (e.g. x-rays, $\alpha$-rays, $\beta$-rays, $\gamma$-rays, electron beams, and uv (ultraviolet) radiation) and which, upon stimulation by exciting light such as visible light, give off a burst of light emission in proportion to the accumulated energy. Such phosphors called stimulable phosphors are employed in medical and various other applications.

An exemplary application is a radiation image information recording and reproducing system which employs a stimulable phosphor panel having a film formed of the stimulable phosphor (stimulable phosphor layer). The film is hereinafter referred to simply as a phosphor layer and the panel is hereinafter referred to simply as a phosphor panel or sometimes as a radiation image converting sheet. This radiation image information recording and reproducing system has already been commercialized as FCR (Fuji Computed Radiography) from Fuji Photo Film Co., Ltd.

In that system, a subject such as a human body is irradiated with x-rays or the like to record radiation image information about the subject on the phosphor panel (more specifically, the phosphor layer). After the radiation image information is thus recorded, the phosphor panel is scanned two-dimensionally with exciting light such as laser light to produce stimulated emission which, in turn, is read photoelectrically to yield an image signal. Then, an image reproduced on the basis of the read image signal is output as the radiation image of the subject, typically to a display device such as CRT or on a recording material such as a photographic material.

The phosphor panel is typically produced by the steps of first preparing a coating solution having the particles of a stimulable phosphor dispersed in a solvent containing a binder, etc., applying the coating solution to a support in panel form that is made of glass or resin, and drying the applied coating.

Phosphor panels are also known that are made by forming a phosphor layer on a support through methods of gas phase deposition (vapor-phase film formation) such as vacuum evaporation or sputtering, as disclosed in JP 2789194 B and JP 5-249299 A. The phosphor layer prepared by the gas phase deposition has excellent characteristics. First, it contains less impurities since it is formed under vacuum; in addition, it is substantially free of any substances other than the stimulable phosphor, as exemplified by the binder, so it has high uniformity in performance and still assures very high luminous efficiency.

One factor for deterioration of characteristics of the phosphor panel is moisture absorption by the stimulable phosphor layer.

The stimulable phosphor layer, in particular, an alkali halide-based stimulable phosphor layer having favorable characteristics, has high moisture absorption property and easily absorbs moisture even in a normal environment (normal temperature/normal humidity). As a result, deterioration of sharpness of a reproduced image or the like occurs due to deterioration of photostimulated luminescence characteristics, that is, sensitivity, or deterioration of crystallinity of the stimulable phosphor (destruction of columnar crystals in a case of an alkali halide-based stimulable phosphor having a columnar structure, for example).

In order to solve such problems, the phosphor layer is sealed with a moisture-proof member in the phosphor panel.

For example, JP 2677822 B discloses a phosphor panel having a phosphor layer sealed with a moisture-proof protective layer in which deterioration of characteristics of the phosphor panel due to moisture is prevented by: providing a sealing member on the periphery of the phosphor layer; and filling a dry gas into a space formed by a support, the protective layer, and the sealing member.

Further, JP 2886165 B discloses a phosphor panel having a stimulable phosphor layer similarly sealed with a protective layer, including: a protective layer holding member provided to surround a peripheral portion of the stimulable phosphor layer; and a low refractive index layer, which has a lower refractive index than that of the protective layer, provided between the stimulable phosphor layer and the protective layer. The stimulable phosphor layer is formed in a space blocked from the external atmosphere by the protective layer, the protective layer holding member, and a support.

The phosphor panels disclosed in JP 2677822 B and JP 2886165 B can prevent deterioration of characteristics due to moisture absorption by the phosphor layer to some extent.

However, the inventors of the present invention have conducted studies and have found that sufficient moisture-proof property cannot be attained only by sealing of the phosphor layer with a moisture-proof member, particularly under severe conditions such as high humidity and high temperature. The moisture-proof property is not yet sufficient for obtaining a phosphor panel having excellent characteristics such as providing a reproduced image with high sensitivity and favorable sharpness over a long period of time.

SUMMARY OF THE INVENTION

The present invention aims at solving problems of prior art, and an object of the present invention is therefore to provide a high quality stimulable phosphor panel capable of preventing deterioration of characteristics of a stimulable phosphor layer due to moisture absorption over a long period of time.

Another object of the present invention is to provide a method of producing the stimulable phosphor panel.

In order to achieve the above object, according to a first aspect of the present invention, there is provided a stimulable phosphor panel, including: a support; a stimulable phosphor layer formed on said support through gas phase deposition; a moisture-proof protective layer for sealing said stimulable phosphor layer on said support; and a sealing adhesive layer for bonding an outer periphery of said moisture-proof protective layer to said support, wherein said sealing adhesive layer has a moisture permeability of 1,000 g/m$^2$·day or less as an adhesive after curing, a width of 2 mm to 10 mm, and a thickness of 0.5 µm to 20 µm.

In the provided a stimulable phosphor panel according to the first aspect of the present invention, it is preferable that said support comprises a substrate on which said stimulable phosphor layer is formed and to which said moisture-proof protective layer is bonded through said sealing adhesive layer. Futher, it is preferable that a surface of said stimulable phosphor layer and said moisture-proof protective layer are bonded together through a stimulable phosphor adhesive layer. Futher, it is preferable that said stimulable phosphor adhesive layer and said sealing adhesive layer are unified. Futher, it is preferable that said support comprises a substrate on which said stimulable phosphor layer is formed and a sealing member which surrounds said stimulable phosphor layer in a surface direction of said substrate and is bonded to said moisture-proof protective layer through said sealing adhesive layer. Futher, it is preferable that a difference between heights of said sealing member and said stimulable phosphor layer is 0.1 mm or less. Futher, it is preferable that a groove whose shape corresponds to a bottom surface of said sealing member is formed in a surface of said substrate and said sealing member is inserted into said groove. Futher, it is preferable that said moisture-proof protective layer comprises a base, a first $SiO_2$ film formed on a surface of said base, a hybrid layer of $SiO_2$ and polyvinyl alcohol formed on said first $SiO_2$ film, and a second $SiO_2$ film formed on said hybrid layer. Futhermore it is preferable that said stimulable phosphor layer is formed of a stimulable phosphor represented by CsBr:Eu.

Futher, according to second aspect of the present invention, there is a method of producing a stimulable phosphor panel including: forming a stimulable phosphor layer on a support through gas phase deposition; forming an adhesive layer so as to have a width in a range of 2 mm to 10 mm and a thickness in a range of 0.5 μm to 20 μm after sealing, by using an adhesive having a moisture permeability of 1,000 $g/m^2·day$ or less after curing; and bonding a moisture-proof protective layer to said support through said adhesive layer to seal said stimulable phosphor layer formed on said support.

In a method of producing a stimulable phosphor panel according to the second aspect of the present invention, it is preferable that said support comprises a substrate, said stimulable phosphor layer is formed on said substrate and said moisture-proof protective layer is bonded to said substrate through said sealing adhesive layer. Futher it is preferable that a surface of said stimulable phosphor layer and said moisture-proof protective layer are bonded together while said stimulable phosphor layer is sealed. Futher it is preferable that said adhesive layer is formed on an entire surface of said moisture-proof protective layer. Futher it is preferable that said support comprises a substrate on which said stimulable phosphor layer is formed and a sealing member which surrounds in an outer periphery of said substrate a region where said stimulable phosphor layer is formed and which is fixed on said substrate prior to forming said stimulable phosphor layer, and said sealing member and said moisture-proof protective layer are bonded together through said adhesive layer to seal said stimulable phosphor layer. Futher it is preferable that a difference between heights of said sealing member and said stimulable phosphor layer is 0.1 mm or less. Futher it is preferable that a groove whose shape corresponds to a bottom surface of said sealing member is formed in a surface of said substrate and said sealing member is inserted into said groove. Futher it is preferable that said stimulable phosphor layer is sealed with said adhesive layer through heat lamination. Futher it is preferable that said adhesive layer is heated in a range of a temperature lower than a softening point of said adhesive layer by 30° C. to 150° C. prior to said heat lamination. Futher it is preferable that said moisture-proof protective layer comprises a base, a first $SiO_2$ film formed on a surface of said base, a hybrid layer of $SiO_2$ and polyvinyl alcohol formed on said first $SiO_2$ film, and a second $SiO_2$ film formed on said hybrid layer. Futhermore it is preferable that said stimulable phosphor layer is formed of a stimulable phosphor represented by CsBr:Eu.

The present invention can provide a high quality stimulable phosphor panel capable of preventing deterioration of characteristics of a stimulable phosphor layer due to moisture absorption over a long period of time even under severe conditions such as high temperature and high humidity.

DETAILED DESCRIPTION OF THE INVENTION

Hereinafter, a stimulable phosphor panel and a method of producing the stimulable phosphor panel according to the present invention will be described in detail using the attached drawings.

Figure 1:
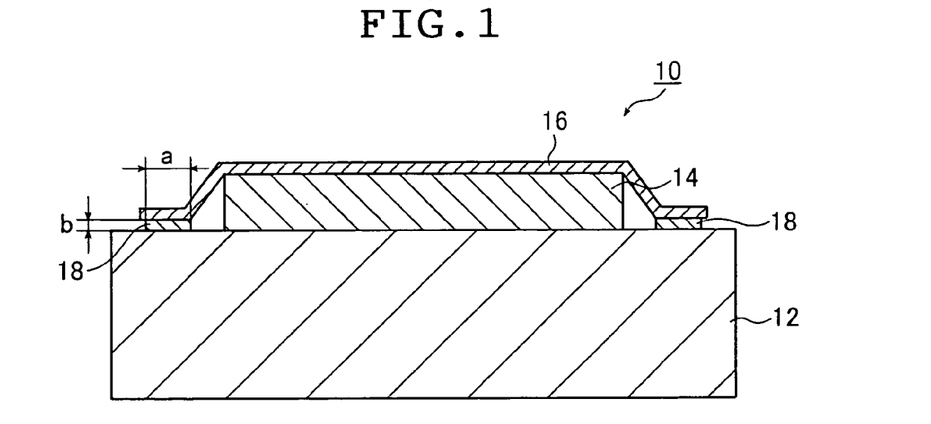
FIG. 1 is a sectional view showing a schematic structure of an example of a phosphor panel according to the present invention.

FIG. 1 is a schematic sectional view showing an example of a phosphor panel of the present invention produced through a production method of the present invention.

A stimulable phosphor panel (hereinafter, referred to as phosphor panel) 10 of the present invention is provided with: a substrate 12; a film of a stimulable phosphor (stimulable phosphor layer, hereinafter, referred to as phosphor layer) 14 formed through gas phase deposition(or vacuum film deposition); a moisture-proof protective layer 16 bonded to the substrate 12 by sealing the phosphor layer 14; and a sealing adhesive layer 18 for bonding the periphery of the moisture-proof protective layer 16 to the substrate 12. In this example, a substrate 12 is used to support the phosphor layer 14 as a support of the present invention. In the present invention, the sealing adhesive layer 18 has a moisture permeability of 1,000 $g/m^2·day$ or less, a width a of 2 mm to 10 mm, and a thickness b of 0.5 μm to 20 μm.

According to the present invention, a structure (such as layer structure) of the phosphor panel 10 methods of forming the phosphor layer 14, the moisture-proof protective layer 16, and the sealing adhesive layer 18, a heat treatment method for the phosphor layer 14, a method of producing the phosphor panel 10, steps after sealing of the phosphor layer 14, and steps before formation of the phosphor layer 14 are not particularly limited as long as the above conditions are satisfied. Basically, the phosphor panel 10 may be produced through a method similar to a normal production method.

The substrate 12 in the phosphor panel 10 of the present invention is not particularly limited and various substrates used in the phosphor panel 10 may be used.

Examples of the substrate 12 include: plastic films such as a cellulose acetate film, polyester film, polyethylene terephthalate film, polyamide film, polyimide film, triacetate film, and polycarbonate film; glass plates made of quartz glass, non-alkali glass, soda glass, heat resistant glass (Pyrex™, etc.), and the like; metal sheets such as an aluminum sheet, iron sheet, copper sheet and chromium sheet; and metal sheets having a metal oxide coating layer.

The phosphor layer 14 is formed on a surface of the above-mentioned substrate 12 through gas phase deposition.

In the present invention, various treatments can be carried out before formation of the phosphor layer 14 as described above. For example, a reflective film may be formed on a surface of the substrate 12 for reflecting photostimulated luminescence, or a barrier layer or the like may additionally be formed on the reflective film for protecting the reflective film. That is, in the present invention, the phosphor layer 14 may be formed on a surface of the substrate 12 having the reflective film or the protective film formed thereon.

Various materials can be used as the stimulable phosphor constituting the phosphor layer 14. Preferred examples of the stimulable phosphor are given below.

Stimulable phosphors disclosed in U.S. Pat. No. 3,859,527 are "SrS:Ce, Sm", "SrS:Eu, Sm", "ThO$_2$:Er", and "La$_2$O$_2$S:Eu, Sm".

JP 55-12142 A discloses "ZnS:Cu, Pb", "BaO.xAl$_2$O$_3$:Eu (0.8≦x≦10)", and stimulable phosphors represented by the general formula "M$^{II}$O.xSiO$_2$:A". In this formula, M$^{II}$ is at least one element selected from the group consisting of Mg, Ca, Sr, Zn, Cd, and Ba, A is at least one element selected from the group consisting of Ce, Tb, Eu, Tm, Pb, Tl, Bi, and Mn, and 0.5≦x≦2.5.

Stimulable phosphors represented by the general formula "LnOX:xA" are disclosed by JP 55-12144 A. In this formula, Ln is at least one element selected from the group consisting of La, Y, Gd, and Lu, X is at least one-element selected from Cl and Br, A is at least one element selected from Ce and Tb, and 0≦x≦0.1.

Stimulable phosphors represented by the general formula "(Ba$_{1-x}$, M$^{2+}_x$)FX:yA" are disclosed by JP 55-12145 A. In this formula, M$^{2+}$ is at least one element selected from the group consisting of Mg, Ca, Sr, Zn, and Cd, X is at least one element selected from Cl, Br, and I, A is at least one element selected from Eu, Tb, Ce, Tm, Dy, Pr, Ho, Nd, Yb, and Er, 0≦x≦0.6, and 0≦y≦0.2.

JP 57-14825 A discloses the following stimulable phosphors. That is, the stimulable phosphors are represented by the general formula "xM$_3$(PO$_4$)$_2$.NX$_2$:yA" or "M$_3$(PO$_4$)$_2$.yA". In this formula, M and N are each at least one element selected from the group consisting of Mg, Ca, Sr, Ba, Zn, and Cd, X is at least one element selected from F, Cl, Br, and I, A is at least one element selected from Eu, Tb, Ce, Tm, Dy, Pr, Ho, Nd, Yb, Er, Sb, Tl, Mn, and Sn, 0≦x≦6, and 0≦y≦1.

Stimulable phosphors are represented by the general formula "nReX$_3$.mAX'$_2$:xEu" or "nReX$_3$.mAX'$_2$:xEu, ySm". In this formula, Re is at least one element selected from the group consisting of La, Gd, Y, and Lu, A is at least one element selected from Ba, Sr, and Ca, X and X' are each at least one element selected from F, Cl, and Br, 1×10$^{-4}$<x<3×10$^{-1}$, 1×10$^{-4}$<y<1×10$^{-1}$, and 1×10$^{-3}$<n/m<7×10$^{-1}$.

Alkali halide-based stimulable phosphors are represented by the general formula "M$^I$X.aM$^{II}$X'$_2$.bM$^{III}$X"$_3$:cA". In this formula, M$^I$ represents at least one element selected from the group consisting of Li, Na, K, Rb, and Cs. M$^{II}$ represents at least one divalent metal selected from the group consisting of Be, Mg, Ca, Sr, Ba, Zn, Cd, Cu, and Ni. M$^{III}$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga, and In. X, X', and X" each represent at least one element selected from the group consisting of F, Cl, Br, and I. A represents at least one element selected from the group consisting of Eu, Tb, Ce, Tm, Dy, Pr, Ho, Nd, Yb, Er, Gd, Lu, Sm, Y, Tl, Na, Ag, Cu, Bi, and Mg, 0≦a<0.5, 0≦b<0.5, and 0≦c<0.2.

Stimulable phosphors represented by the general formula "(Ba$_{1-x}$, M$^{II}_x$)F$_2$.aBaX$_2$:yEu, zA" are disclosed by JP 56-116777 A. In this formula, M$^{II}$ is at least one element selected from the group consisting of Be, Mg, Ca, Sr, Zn, and Cd, X is at least one element selected from Ci, Br, and I, A is at least one element selected from Zr and Sc, 0.5≦a≦1.25, 0≦x≦1, 1×10$^{-6}$≦y≦2×10$^{-1}$ and 0≦z≦1×10$^{-2}$.

Stimulable phosphors represented by the general formula "M$^{III}$OX:xCe" are disclosed by JP 58-69281 A. In this formula, M$^{III}$ is at least one trivalent metal selected from the group consisting of Pr, Nd, Pm, Sm, Eu, Tb, Dy, Ho, Er, Tm, Yb, and Bi, X is at least one element selected from Cl and Br, and 0≦x≦0.1.

Stimulable phosphors represented by the general formula "Ba$_{1-x}$M$_a$L$_a$FX:yEu$^{2+}$" are disclosed by JP 58-206678 A. In this formula, M is at least one element selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one element selected from Cl, Br, and I, 1×10$^{-2}$≦x≦0.5, 0≦y≦0.1, and a is x/2.

Stimulable phosphors represented by the general formula "M$^{II}$FX.aM$^I$X'.bM$^{III}$X"$_2$.cM$^{III}$X$_3$.xA:yEu$^{2+}$" are disclosed by JP 59-75200 A. In this formula, M$^{II}$ is at least one element selected from the group consisting of Ba, Sr, and Ca, M$^I$ is at least one element selected from Li, Na, K, Rb, and Cs, M$^{II}$ is at least one divalent metal selected from Be and Mg, M$^{III}$ is at least one trivalent metal selected from the group consisting of Al, Ga, In, and Tl, A is a metal oxide, X, X', and X" are each one element selected from the group consisting of F, Cl, Br, and I, 0≦a≦2, 0≦b≦1×10$^{-2}$, 0≦c≦1×10$^{-2}$, and a+b+c≧10$^{-6}$, 0<x≦0.5, and 0<y≦0.2.

Alkali halide-based stimulable phosphors disclosed by JP 57-148285 A are preferred because they have excellent photostimulated luminescence characteristics and the effect of the present invention is advantageously obtained. Alkali halide-based stimulable phosphors in which M$^I$ contains at least Cs, X contains at least Br, and A is Eu or Bi are more preferred, and stimulable phosphors represented by the general formula "CsBr:Eu" are particularly preferred.

The phosphor layer 14 is formed of such a stimulable phosphor as described above. A method of forming the phosphor layer 14 is not particularly limited and various gas phase deposition techniques such as vacuum evaporation, sputtering, chemical vapor deposition (CVD) can be employed.

Of those, vacuum evaporation is preferably employed to form the phosphor layer 14 from the viewpoint of productivity or the like. In particular, multi-source evaporation is further preferably employed to form the phosphor layer 14, in which a material for a phosphor component and a material for an activator component are evaporated separately under heating. For example, the phosphor layer 14 of "CsBr:Eu" is preferably formed through multi-source evaporation in which cesium bromide (CsBr) as a material for the phosphor component and europium bromide ($EuBr_x$ (x is generally 2 to 3)) as a material for the activator component are evaporated separately under heating.

A heating method in vacuum evaporation is not particularly limited. The phosphor layer 14 may be formed through electron beam heating employing an electron gun or the like or through resistance heating. When the phosphor layer 14 is formed through multi-source evaporation, all materials may be evaporated under heating by the same heating means (such as electron beam heating). Alternatively, the material for the phosphor component may be evaporated under heating through electron beam heating, and the material for the activator component, which is in a trace amount, may be evaporated under heating through resistance heating.

There are no particularly limited conditions for film deposition under which the phosphor layer 14 must be formed, and the phosphor layer 14 may be formed under conditions for film deposition arbitrarily determined in accordance with a film deposition method or a composition or the like of the phosphor layer 14 to be formed. For example, the phosphor layer 14 is preferably formed through vacuum evaporation at a degree of vacuum of $1\times10^{-5}$ Pa to $1\times10^{-2}$ Pa and a film deposition rate of 0.05 µm/min to 300 µm/min. Note that in forming the phosphor layer 14 through multi-source evaporation, evaporation rates of the materials for the phosphor component and the activator component are controlled such that an amount ratio of the phosphor component to the activator component falls within a target range.

According to the studies conducted by the inventors of the present invention, when various stimulable phosphors as described above, in particular, an alkali halide-based stimulable phosphor such as CsBr:Eu is subjected to film deposition through vacuum evaporation, the phosphor layer 14 is preferably formed by: evacuating a system to a high degree of vacuum once; introducing an argon gas, a nitrogen gas, or the like into the system to adjust to a medium degree of vacuum of about 0.01 Pa to 3 Pa; and carrying out vacuum evaporation through resistance heating under medium vacuum. The alkali halide-based phosphor layer such as CsBr:Eu has a columnar crystal structure, and the phosphor layer 14 obtained through film deposition under medium vacuum has a particularly favorable columnar crystal structure, and thus is preferable from the viewpoint of sharpness of an image with photostimulated luminescence characteristics.

The phosphor layer 14 formed may be heated at 300° C. or lower during film deposition through heating of the substrate 12 or the like. The heating of the phosphor layer 14 is preferably carried out at 200° C. or lower.

The thickness of the phosphor layer 14 is not particularly limited, but the phosphor layer 14 preferably has a thickness of 50 µm or more. The phosphor layer 14 particularly preferably has a thickness of 200 µm or more.

The thus-formed phosphor layer 14 is subjected to heat treatment (annealing) for favorably developing photostimulated luminescence characteristics and improving the photostimulated luminescence characteristics thereof.

The annealing condition for the phosphor layer 14 is not particularly limited. For example, the phosphor layer 14 is preferably annealed in an inert atmosphere such as a nitrogen atmosphere at 50° C. to 600° C. (particularly 100° C. to 300° C.) for 10 minutes to 10 hours (particularly 30 minutes to 3 hours).

The heat treatment for the phosphor layer 14 may be carried out through a known method such as a method employing a firing furnace. Further, if a vacuum evaporation apparatus includes a heating means for the substrate 12, the heat treatment can be carried out using the heating means.

In the phosphor panel 10 of the present invention, the moisture-proof protective layer 16 covers and seals the phosphor layer 14 for preventing moisture absorption of the phosphor layer 14 formed through vacuum evaporation (gas phase deposition).

The moisture-proof protective layer 16 is not particularly limited as long as it has sufficient moisture-proof property, and various types thereof can be used.

For example, the moisture-proof protective layer 16 is formed of 3 layers on a polyethylene terephthalate (PET) film: an $SiO_2$ film; a hybrid layer of $SiO_2$ and polyvinyl alcohol (PVA); and an $SiO_2$ film. Other preferable examples of the moisture-proof protective layer 16 include: a glass sheet (film); a resin film of polyethylene terephthalate, polycarbonate, or the like; and a film having an inorganic substance such as $SiO_2$, $Al_2O_3$, or SiC deposited on the resin film. For formation of the moisture-proof protective film 16 having 3 layers of $SiO_2$ film/hybrid layer of $SiO_2$ and PVA/$SiO_2$ film on the PET film, the $SiO_2$ films may be formed through sputtering and the hybrid layer may be formed through a sol-gel process, for example. The hybrid layer is preferably formed to have a ratio of PVA to $SiO_2$ of 1:1.

In the phosphor panel 10 of the present invention, the sealing adhesive layer 18 is used to bond together the moisture-proof protective layer 16 and the substrate 12 to seal the phosphor layer 14 with the moisture-proof protective layer 16. In the present invention, the sealing adhesive layer 18 is formed using an adhesive having a moisture permeability of 1,000 g/m²·day or less (under conditions of 40° C. and a relative humidity of 90%, per 100 µm of thickness) and has a width a of 2 mm to 10 mm and a thickness b of 0.5 µm to 20 µm.

The moisture-proof protective layer 16, the phosphor layer 14 and the substrate 12 are bonded together through the sealing adhesive layer 18, and thus the phosphor panel 10 of the present invention develops exceptional moisture-proof property and can maintain favorable characteristics over a long period of time even under severe conditions such as high temperature and high humidity.

The stimulable phosphor forming the stimulable phosphor layer 14, in particular, an alkali halide-based stimulable phosphor has moisture absorption property and easily absorbs moisture even under normal conditions, resulting in deterioration of sensitivity or sharpness in a reproduced image, or the like. In order to prevent such disadvantages, the phosphor layer 14 has been conventionally sealed with the moisture-proof protective layer 16, but a sufficient moisture-proof effect is not obtained through the current sealing method for the phosphor layer 14 as described above. The inventors of the present invention have conducted intensive studies for solving such problems, and have found that moisture permeation from a sealing portion during sealing of the phosphor layer 14 deteriorates the characteristics of the phosphor panel. Further, the inventors of the present invention have found that moisture permeation from the sealing adhesive layer 18 between the substrate 12 and the moisture-proof protective layer 16 can be prevented by providing the sealing adhesive layer 18 with the above structure, and have completed the present invention.

A material for forming the sealing adhesive layer 18 is not particularly limited, and various adhesives can be used as long as the sealing adhesive layer 18 can realize a moisture permeability of 1,000 g/m$^2$·day or less after curing with a width a in a range of 2 mm to 10 mm and a thickness b in a range of 0.5 µm to 20 µm.

For example, an adhesive of an epoxy resin, a polyester-based resin, or the like is preferable, and a thermoplastic polymer resin is particularly preferable as the material. An adhesive having a moisture permeability of 500 g/m$^2$·day or less per 100 µm thickness after curing under the conditions of 40° C. and a relative humidity of 90% is preferably used. An adhesive having a moisture permeability exceeding 1,000 g/m2·day provides a small moisture permeation preventing effect and sufficient moisture-proof effect cannot be obtained.

As described above, the sealing adhesive layer 18 has a width a of 2 mm to 10 mm, and a thickness b of 0.5 µm to 20 µm.

The sealing adhesive layer 18 having a width a of less than 2 mm may not provide sufficient adhesion between the substrate 12 and the moisture-proof protective layer 16, causing problems such as peeling of the moisture-proof protective layer 16. In contrast, the sealing adhesive layer 18 having a width a exceeding 10 mm may excessively increase the size of the sealing adhesive layer 18 with respect to the size of the entire phosphor panel 10 and decreases the size of an image pickup surface with respect to that of the phosphor panel 10 causing problems in practicality of the phosphor panel 10. The sealing adhesive layer 18 preferably has a width a of 3 mm to 6 mm.

The sealing adhesive layer 18 having a thickness b of less than 0.5 µm may not provide sufficient adhesion between the substrate 12 and the moisture-proof protective layer 16, causing problems such as peeling of the moisture-proof protective layer 16. In contrast, the sealing adhesive layer 18 having a thickness b exceeding 20 µm may easily cause moisture permeation from the sealing adhesive layer 18. The sealing adhesive layer 18 preferably has a thickness of 0.8 µm to 10 µm.

Hereinafter, an example of a method of producing the phosphor panel 10 of the present invention will be described.

First, the phosphor layer 14 is formed on the surface of the substrate 12 as described above. Next, an arbitrarily selected adhesive is applied using a dispenser or the like at a bonding position between the substrate 12 and the moisture-proof protective layer 16 surrounding the phosphor layer 14 on the surface of the substrate 12 such that the sealing adhesive layer 18 has a width a of 2 mm to 10 mm and a thickness b of 0.5 µm to 20 µm. Then, the phosphor layer 14 is covered with the moisture-proof protective layer 16.

Finally, a press mold having a pressing surface constituted of rubber and corresponding to the shape of a sealing portion (region with adhesive applied) of the moisture-proof protective layer 16 with the sealing adhesive layer 18 is used to press the sealing portion against the substrate 12. This state is maintained to cure the adhesive. Thus, the moisture-proof protective layer 16 and the substrate 12 are bonded together through the sealing adhesive layer 18 and the phosphor layer 14 is sealed to thereby obtain the phosphor panel 10.

As described above, a reflective film, a barrier film, and the like may be formed on the substrate 12 before formation of the phosphor layer 14, and the substrate having the films formed thereon may be used as the substrate 12. As described above, there is no particular limitation after sealing of the phosphor layer 14.

Figure 2:
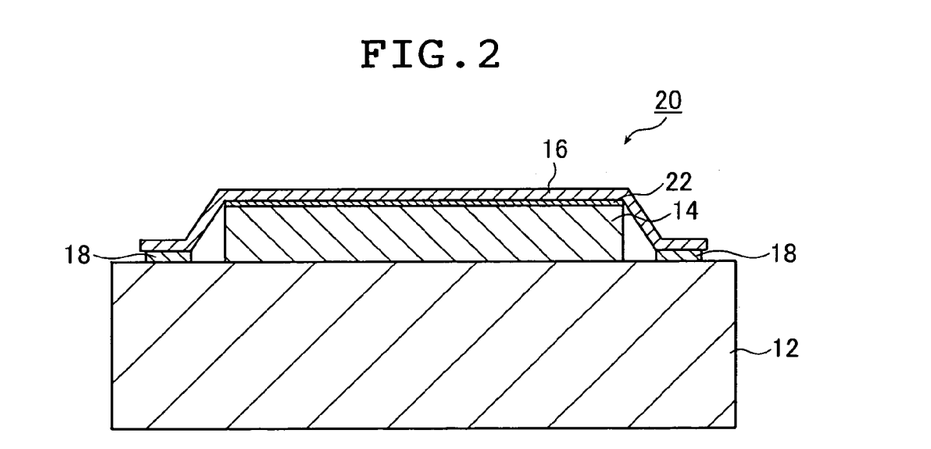
FIG. 2 is a sectional view showing a schematic structure of another example of the phosphor panel according to the present invention.

FIG. 2 shows another example of the phosphor panel according to the present invention.

A phosphor panel 20 basically has the same structure as the example shown in FIG. 1, and thus the same reference numerals represent the same members. Different members are mainly described below.

The phosphor panel 20 shown in FIG. 2 further includes a stimulable phosphor adhesive layer 22 for bonding together the phosphor layer 14 and the moisture-proof protective layer 16, in addition to the phosphor panel 10 of FIG. 1. The phosphor panel 20 preferably has the stimulable phosphor adhesive layer 22 from the viewpoints of preventing floating of the moisture-proof protective layer 16, durability over a long period of time, and the like.

The stimulable phosphor adhesive layer 22 is not particularly limited as long as it provides sufficient adhesion and has optical characteristics that do not inhibit incidence of radiation or excitation light and emission of photostimulated luminescence. The stimulable phosphor adhesive layer 22 may be formed using various adhesives. The adhesive is preferably an epoxy rein or a polyester-based resin, particularly preferably a thermoplastic polymer resin such as a polyester-based resin, for example. The use of the thermoplastic polymer resin allows bonding through heat lamination, thereby improving workability and productivity. The thickness of the stimulable phosphor adhesive layer 22 is not particularly limited, but is preferably 0.8 µm to 10 µm.

The size of the stimulable phosphor adhesive layer 22 is not particularly limited as long as it is formed into a size that covers the surface of the phosphor layer 14. A method and conditions for forming the stimulable phosphor adhesive layer 22 are not particularly limited. For example, the stimulable phosphor adhesive layer 22 is preferably formed through application.

Hereinafter, an example of the method of producing the phosphor panel 20 will be described.

First, as in the phosphor panel 10 of FIG. 1, the phosphor layer 14 is formed on the surface of the substrate 12, and the sealing adhesive layer 18 is formed at a bonding position between the substrate 12 and the moisture-proof protective layer 16 surrounding the phosphor layer 14 on the surface of the substrate 12 in the same manner as the method of producing the phosphor panel 10.

Meanwhile, the stimulable phosphor adhesive layer 22 is formed to have a predetermined thickness through application using an arbitrarily selected adhesive in a predetermined region at the center of the surface of the moisture-proof protective layer 16 and/or on the surface of the phosphor layer 14.

Finally, the phosphor layer 14 is covered with the moisture-proof protective layer 16 having the stimulable phosphor adhesive layer 22. Heat lamination is carried out at a predetermined temperature and linear velocity using a laminating machine for contact bonding under pressure, and the moisture-proof protective layer 16 and the phosphor layer 14 are bonded together through the stimulable phosphor adhesive layer 22, for example. The moisture-proof protective layer 16 that has the stimulable phosphor adhesive layer 22 and covers the phosphor layer 14 is preferably passed through the laminating machine in one direction a predetermined number of times (several times) for improving the bonding strength. Next, these layers are pressed using a press mold in the same manner as the phosphor panel 10. The moisture-proof protective layer 16 and the substrate 12 are bonded together through the sealing adhesive layer 18 to thereby seal the phosphor layer 14.

The sealing portion and the phosphor layer 14 are heated within a range of a temperature lower than a softening point of the sealing adhesive layer 18 by 30° C. to 150° C. before sealing of the phosphor layer 14 with the moisture-proof protective layer 16. Thus, the bonding strength can be improved in bonding of the moisture-proof protective layer 16 to the substrate 12 through the sealing adhesive layer 18, and a favorable bonding strength can be obtained in one lamination process. The heating may be carried out through heating of the substrate 12, for example.

Figure 3:
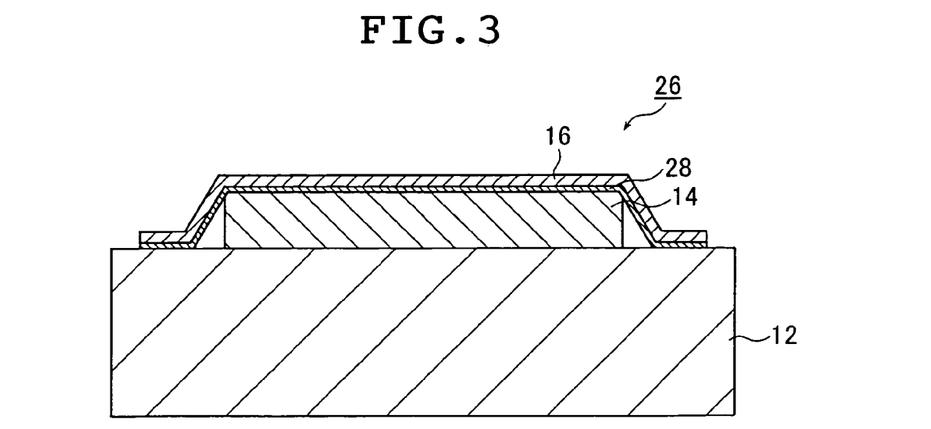
FIG. 3 is a sectional view showing a schematic structure of still another example of the phosphor panel according to the present invention.

FIG. 3 shows still another example of the phosphor panel according to the present invention.

A phosphor panel 26 basically has the same structure as the example shown in FIG. 1, and thus the same reference numerals represent the same members. Different members are mainly described below.

The phosphor panel 26 shown in FIG. 3 is the phosphor panel 20 of FIG. 2 having the stimulable phosphor adhesive layer 22 and the sealing adhesive layer 18 formed integrally. To be specific, as shown in FIG. 3, the phosphor panel 26 includes a stimulable phosphor adhesive layer 28 serving as the sealing adhesive layer 18 and the stimulable phosphor adhesive layer 22 bonding together the moisture-proof protective layer 16 and the phosphor layer 14. The phosphor panel 26 preferably has the stimulable phosphor adhesive layer 28 from the viewpoint of durability or the like, as in the stimulable phosphor adhesive layer 22. Further, with such a structure, the moisture-proof protective layer 16, the phosphor layer 14, and the substrate 12 can be bonded together simultaneously, which is advantageous from the viewpoints of productivity and workability. The stimulable phosphor adhesive layer 28 preferably has a thickness of 0.8 µm to 10 µm.

The stimulable phosphor adhesive layer 28 may be formed from the same material as that of the sealing adhesive layer 18 of the phosphor panel 10 as long as it has optical characteristics that do not inhibit incidence of radiation or excitation light and emission of photostimulated luminescence. The use of a thermoplastic polymer resin allows bonding through heat lamination, thereby improving workability and productivity.

A method and conditions for forming the stimulable phosphor adhesive layer 28 are not particularly limited. The stimulable phosphor adhesive layer 28 is formed to have a predetermined thickness over the entire surface of the moisture-proof protective layer 16 such that the sealing portion (corresponding to the sealing adhesive layer 18) between the substrate 12 and the moisture-proof protective layer 16 after sealing has a width of 2 mm to 10 mm and a thickness of 0.5 µm to 20 µm. For example, the stimulable phosphor adhesive layer 28 is preferably formed through application.

An example of a method of producing the phosphor panel 26 will be described.

The phosphor panel 14 is formed on the surface of the substrate 12 as described above.

Meanwhile, the stimulable phosphor adhesive layer 28 is formed to have a predetermined thickness using an arbitrarily selected adhesive on the entire surface of the moisture-proof protective layer 16. The stimulable phosphor adhesive layer 28 is formed such that the sealing portion between the substrate 12 and the moisture-proof protective layer 16 after sealing has a width a of 2 mm to 10 mm and a thickness b of 0.5 µm to 20 µm.

The stimulable phosphor adhesive layer 28 bonds together the moisture-proof protective layer 16 and the phosphor layer 14, and further bonds together the moisture-proof protective layer 16 and the substrate 12. The stimulable phosphor adhesive layer 28 integrates a layer for bonding together the moisture-proof protective layer 16 and the phosphor layer 14 with a layer for bonding together the phosphor layer 14 with the substrate 12, and can be formed through one application process. The stimulable phosphor adhesive layer 28 is preferable from the viewpoint of durability or the like as described above.

The phosphor layer 14 is covered with the moisture-proof protective layer 16 having the stimulable phosphor adhesive layer 28. Heat lamination is carried out at a predetermined temperature and linear velocity for bonding together the phosphor layer 14 and the moisture-proof protective layer 16, and the moisture-proof protective layer 16 and the substrate 12, as in the phosphor panel 20 of FIG. 2. The surface of the phosphor layer 14 is not flush with a top surface of the substrate 12, and thus a peripheral sealing portion parallel with a direction of the lamination may not be favorably bonded. Thus, when the surface of the phosphor layer 14 is not flush with the top surface of the substrate 12, the direction of the lamination is preferably rotated by 90° and lamination is carried out a predetermined number of times in each direction, to thereby seal the phosphor layer 14.

The substrate 12 may be heated before sealing of the phosphor layer 14 with the moisture-proof protective layer 16 as in the previous examples.

Figure 4:
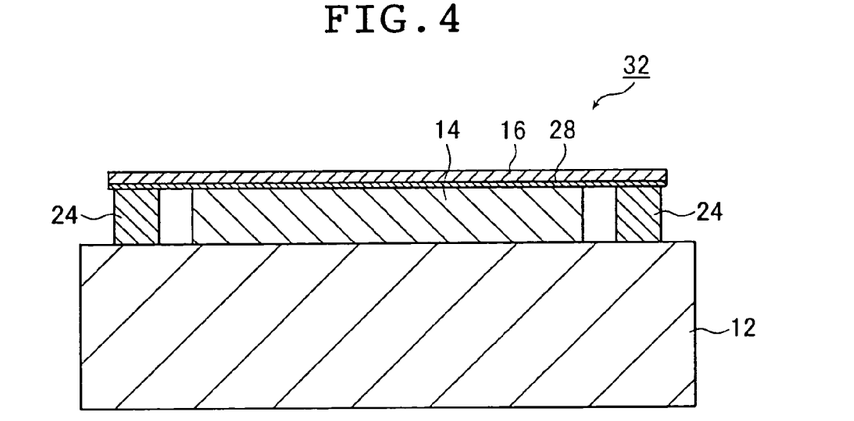
FIG. 4 is a sectional view showing a schematic structure of yet another example of the phosphor panel according to the present invention.

FIG. 4 shows yet another example of the phosphor panel according to the present invention.

A phosphor panel 32 basically has the same structure as the example shown in FIG. 1, and thus the same reference numerals represent the same members. Different members are mainly described below.

The phosphor panel 32 shown in FIG. 4 further includes a frame 24 (sealing member) on the substrate 12, in addition to the phosphor panel 10 of FIG. 1. That is, in this example, the substrate 12 and the frame 24 are used as the support of the invention for supporting the phosphor layer 14. The moisture-proof protective layer 16 is bonded to the frame 24, to thereby seal the phosphor layer 14. Thus, the phosphor panel 32 includes the stimulable phosphor adhesive layer 28 for bonding together the moisture-proof protective layer 16 and the frame 24, and the moisture-proof protective layer 16 and the phosphor layer 14.

A difference between heights of the top surface of the frame 24 and the surface of the phosphor layer 14 is preferably small. A small difference prevents steep bending of the moisture-proof protective layer 16 at a boundary between the sealing portion and the phosphor layer 14 during heat lamination, and can prevent deterioration of the moisture-proof property due to destruction of the moisture-proof layer ($SiO_2$ layer) by the bending. Thus, the difference between heights of the top surface of the frame 24 and the surface of the phosphor layer 14 is preferably as small as possible when the frame 24 is fixed on the substrate 12, and the difference is particularly preferably 0.1 mm or less. The width of the frame 24 is not particularly limited but is preferably 2 mm to 10 mm because the width of the frame 24 often corresponds to the width of the sealing adhesive layer 18.

A material for forming the frame 24 is not particularly limited. Aluminum is preferably used, for example.

The stimulable phosphor adhesive layer 28 may be formed in the same manner as that of the phosphor panel 26 of FIG. 3 using the same material therefor. The top surface of the frame 24 and the surface of the phosphor layer 14 to which the moisture-proof protective layer 16 is bonded are substantially flush with each other, and a thermoplastic polymer resin is used to thereby facilitate bonding through heat lamination. Thus, the workability and the productivity of the phosphor panel 26 are improved.

In this example, the bonding of the phosphor layer 14 to the moisture-proof protective layer 16 is not essential but is a preferable mode.

An example of a method of producing the phosphor panel 32 will be described.

Figure 5:
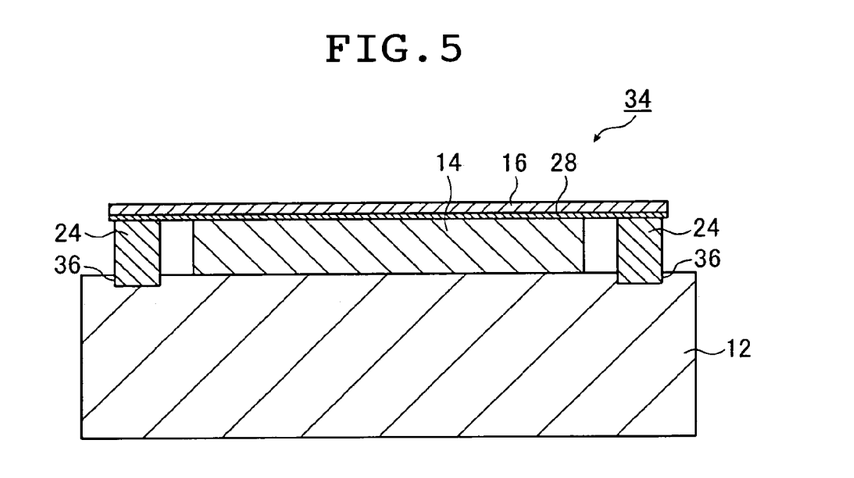
FIG. 5 is a sectional view showing a schematic structure of still yet another example of the phosphor panel according to the present invention.

First, the frame 24 is fixed on the substrate 12. As shown in FIG. 4, as a fixing method, the frame 24 is bonded to or fixed on the surface of the substrate 12 using a heat resistant epoxy adhesive or the like, for example. In order to improve deposition position accuracy of the phosphor layer 14, a groove 36 corresponding to the bottom shape of the frame 24 may be formed on the surface of the substrate 12, and the frame 24 may be fixed therein as shown in FIG. 5. The frame 24 may be fixed to the substrate 12 by merely fitting the frame 24 into the groove 36, by fixing with a heat resistant epoxy resin or the like, or by fitting into the groove 36 using an adhesive.

Next, a Kapton tape with a heat resistant adhesive may be attached onto the frame 24, and an excess portion thereof is cut off along inside of the frame 24. The phosphor layer 14 is formed on the substrate 12 with the frame 24. As described above, the difference between heights of the surface of the phosphor layer 14 and the top surface of the frame 24 is preferably as small as possible, and the difference is particularly preferably 0.1 mm or less.

As in the phosphor panel 26 of FIG. 3, the stimulable phosphor adhesive layer 28 is formed on the entire surface of the moisture-proof protective layer 16, and the phosphor layer 14 is covered with the moisture-proof protective layer 16 having the stimulable phosphor adhesive layer 28. The stimulable phosphor adhesive layer 28 is formed such that a sealing portion (that is, portion corresponding to the sealing adhesive layer 18) between the frame 24 and the moisture-proof protective layer 16 after sealing has a width a of 2 mm to 10 mm and a thickness b of 0.5 μm to 20 μm.

Heat lamination is carried out for bonding together the moisture-proof protective layer 16, the phosphor layer 14, and the frame 24 in the same manner as in the method of producing the phosphor layer 26. The phosphor panel 32 has the frame 24 and has a small difference between heights of the top surface of the frame 24 and the surface of the phosphor layer 14. Thus, the lamination may be carried out a predetermined number of times in one direction.

The substrate 12 may be heated before sealing of the phosphor layer 14 with the moisture-proof protective layer 16 as in the previous examples.

The phosphor panel of the present invention is basically structured as described above, but may be provided with a groove for adhesive into which an adhesive that was not used in forming the sealing adhesive layer 18/stimulable phosphor adhesive layer 28 penetrates. The position for forming the groove for adhesive is not particularly limited, and the groove for adhesive need only be formed at a position corresponding to the sealing adhesive layer 18 or at a position corresponding to a portion that corresponds to the sealing adhesive layer in the stimulable phosphor adhesive layer 28.

Figure 6:
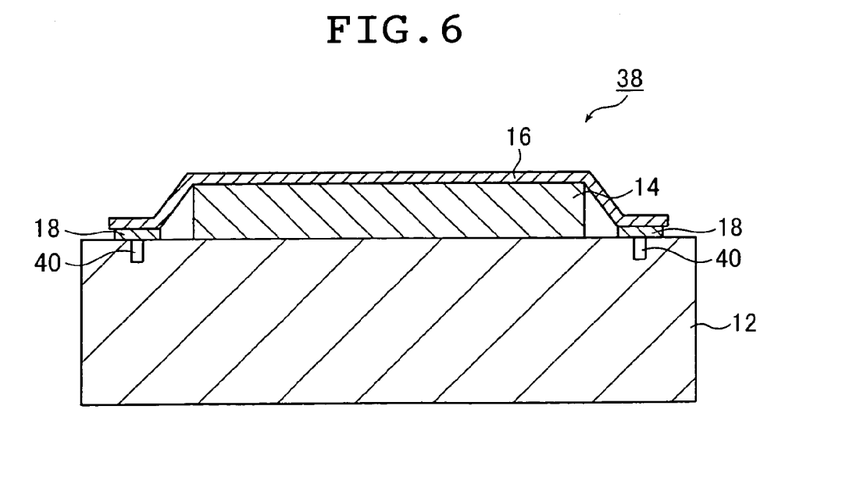
FIG. 6 is a sectional view showing a schematic structure of an example of the phosphor panel according to the present invention.

The phosphor panel having a structure in which the moisture-proof protective layer 16 is directly bonded to the substrate 12 as shown in FIGS. 1 to 3 may be provided with a groove for adhesive 40 at a position corresponding to the sealing adhesive layer 18 on the substrate 12 as shown in FIG. 6, for example.

Figure 7:
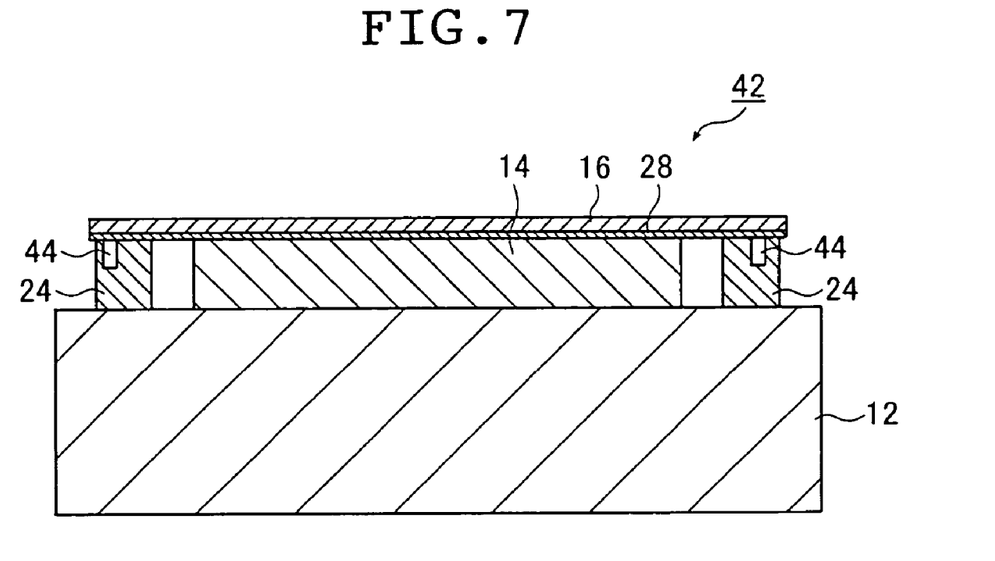
FIG. 7 is a sectional view showing a schematic structure of another example of the phosphor panel according to the present invention.

Further, the phosphor panel having a structure in which the frame 24 is provided and the moisture-proof protective layer 16 is bonded thereto as shown in FIGS. 4 and 5 may be provided with a groove for adhesive 44 on the top surface of the frame 24 as shown in FIG. 7, for example.

The groove for adhesive 40 is provided to form an escape route for an excess adhesive and to prevent horizontal spreading or thick application of the adhesive, thereby facilitating formation of the sealing adhesive layer 18/stimulable phosphor adhesive layer 28 having a desired shape.

When the moisture-proof protective layer 16 is bonded to the frame 24 provided in the phosphor panel of the present invention as shown in FIGS. 4 and 5, a groove for adhesive into which an excess amount of an adhesive in fixing the frame 24 on the substrate 12 penetrates may be provided.

Figure 8:
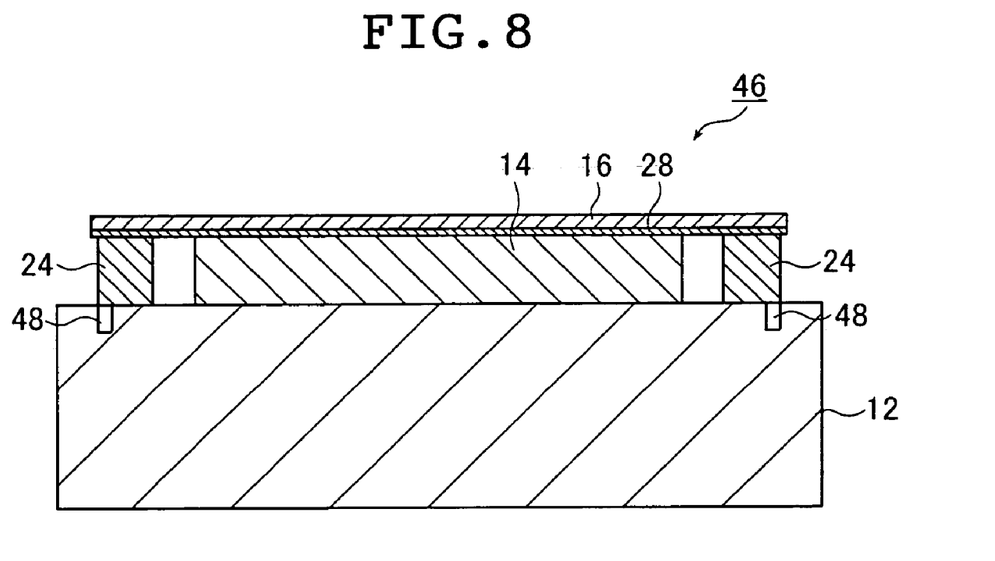
FIG. 8 is a sectional view showing a schematic structure of still another example of the phosphor panel according to the present invention.

The groove for adhesive may be provided anywhere in the sealing portion between the frame 24 and the substrate 12. As shown in FIG. 8, a groove for adhesive 48 may be provided at a position where the frame 24 is fixed on the surface of the substrate 12, for example.

The groove for adhesive 48 can prevent protrusion of the adhesive outside or inside the frame 24 or non-horizontal fixing of the frame 24 with respect to the substrate 12 due to accumulation and solidification of an excess amount of the adhesive.

The structure having the frame 24 may be provided with both the groove 44 for an adhesive used in bonding together the frame 24 and the moisture-proof protective layer 16 and the groove 48 for an adhesive used in fixing the frame 24 onto the substrate 12.

As described above, the stimulable phosphor panel and the method of producing the stimulable phosphor panel according to the present invention have been described. However, the present invention is not limited to the previous examples, and various modifications or changes may be obviously made without departing from the scope of the present invention.

EXAMPLES

Hereinafter, the present invention will be described in more detail with reference to specific examples of the present invention and using the attached drawings. The present invention is obviously not limited to the following examples.

Example 1

A phosphor layer 14 composed of CsBr:Eu was formed on a surface of an aluminum substrate 12 through two-source vacuum evaporation employing europium bromide as a material for an activator and cesium bromide as a material for a phosphor, respectively.

The both materials were heated in a resistance heating apparatus employing tantalum crucibles and DC power supplies each having an output of 6 kW.

An aluminum substrate (hereinafter, referred to as substrate) 12 having an area of 450 mm×450 mm was set on a substrate holder of a vacuum evaporation apparatus (vacuum chamber), and materials were set at respective predetermined positions. Then, the vacuum chamber was closed and evacuation was started. A diffusion pump and a cryogenic coil were used for the evacuation.

When the degree of vacuum reached $8 \times 10^{-4}$ Pa, argon gas was introduced into the vacuum chamber to adjust the degree of vacuum to 0.5 Pa. Power was supplied to the crucibles filled with the respective materials by driving the DC power supplies to thereby form the phosphor layer 14 on the surface of the substrate 12 through resistance heating.

Outputs of the DC power supplies for the both crucibles were adjusted such that a molar concentration ratio of Eu/Cs was 0.003:1 in the phosphor layer 14, and a film deposition rate was 8 µm/min. During film deposition, the surface of the substrate 12 was directly heated using a halogen lamp.

The film deposition was terminated when the thickness of the phosphor layer 14 reached about 710 µm, and the substrate 12 was taken out from the vacuum chamber. The thickness thereof was controlled based on the results of previously performed experiments.

Next, the substrate 12 in which film deposition was terminated was subjected to annealing treatment in a nitrogen atmosphere at 200° C. for 2 hours.

Meanwhile, an $SiO_2$ film was formed to a thickness of 100 nm on a PET film having a thickness of 6 µm through sputtering. A hybrid layer of PVA and $SiO_2$ was formed thereon to a thickness of 600 nm through a sol-gel process such that the ratio of PVA to $SiO_2$ was 1:1. Further, an $SiO_2$ film was formed to a thickness of 100 nm on the hybrid layer through sputtering, to thereby prepare the moisture-proof protective layer 16.

An epoxy resin EP001 (available from Cemedine Co., Ltd.; moisture permeability of 783 g/m²·day (at 40° C. and relative humidity of 90%)) serving as the sealing adhesive layer 18 was applied onto the periphery portion on the substrate 12 using a dispenser. The epoxy resin was applied such that the sealing adhesive layer 18 after sealing had a width of 5 mm and a thickness of 7 µm. The moisture permeability of the epoxy resin was measured by: forming a resin sheet to a thickness of 100 µm after curing; and measuring the moisture permeability of the sheet in accordance with the Dish Method of JIS Z 0208.

Next, the phosphor layer 14 was covered with the moisture-proof protective layer 16 cut into a size of 420 mm×420 mm such that an $SiO_2$ layer side faced the phosphor layer 14. A press mold (pressing surface made of rubber) having a shape corresponding to the sealing adhesive layer 18 was used to press the moisture-proof protective layer 16 against the sealing adhesive layer 18, and this state was maintained. The phosphor layer 14 was thus sealed to thereby produce the phosphor panel 10 shown in FIG. 1.

Comparative Examples 1 to 4

The phosphor panel 10 was produced in the same manner as in Example 1 except that: the thickness of the sealing adhesive layer 18 was changed to 25 µm (Comparative Example 1) or 0.4 µm (Comparative Example 2); or the width of the sealing adhesive layer 18 was changed to 1 mm (Comparative Example 3) or 12 mm (Comparative Example 4).

Example 2

The phosphor layer 14 was formed on the surface of the substrate 12 in the same manner as in Example 1.

Next, an epoxy resin (the same resin as that of Example 1) forming the sealing adhesive layer 18 was applied onto the substrate 12 in the same manner as in Example 1 using a dispenser.

Meanwhile, a polyester-based resin (VYLON 300, available from Toyobo Co., Ltd.; moisture permeability of 139 g/m²·day (at 40° C. and relative humidity of 90%)) was applied onto a central region (400 mm×400 mm) of the same moisture-proof protective layer 16 (surface of $SiO_2$ layer) as that of Example 1, to thereby form the sealing adhesive layer 18 having a thickness of 1.2 µm. The moisture permeability of the polyester-based resin was measured in the same manner as for the epoxy resin of Example 1.

The phosphor layer 14 was covered with the moisture-proof protective layer 16 having the stimulable phosphor adhesive layer 22, and heat lamination was carried out at 100° C. and a linear velocity of 0.5 ml/min using a laminate material, to thereby bond together the moisture-proof protective layer 16 and the phosphor layer 14. The heat lamination was carried out 4 times in the same direction through a laminating machine.

After the moisture-proof protective layer 16 and the phosphor layer 14 were bonded together, the moisture-proof protective layer 16 and the substrate 12 were bonded together through the sealing adhesive layer 18 in the same manner as in Example 1. The phosphor layer 14 was thus sealed to thereby produce the phosphor panel 20 shown in FIG. 2.

Example 3

The phosphor layer 14 was formed on the surface of the substrate 12 in the same manner as in Example 1.

Meanwhile, a polyester-based resin (the same resin as that of Example 2) was applied onto the entire surface ($SiO_2$ layer surface) of the same moisture-proof protective layer 16 as that of Example 1, to thereby form the stimulable phosphor adhesive layer 28 having a thickness of 1.2 µm.

Next, the phosphor layer 14 was covered with the moisture-proof protective layer 16 such that the stimulable phosphor adhesive layer 28 on the moisture-proof protective layer 16 faced the phosphor layer 14. Heat lamination was carried out through a laminating machine 4 times in one direction in the same manner as in Example 2 and then 4 times in a direction obtained by rotating by 90°, to thereby bond together the moisture-proof protective layer 16, the phosphor layer 14, and the substrate 12. The phosphor layer 14 was sealed to thereby produce the phosphor panel 26 shown in FIG. 3.

Example 4

An aluminum frame having outer dimensions of 412 mm×412 mm, a width of 5 mm, and a thickness of 0.7 mm was bonded onto the same substrate 12 as that of Example 1 using a heat resistant epoxy adhesive (Aremco-Bond 526 N, available from Audec Corporation).

Next, a Kapton tape with a heat resistant adhesive (Scotch Kapton tape 5413, available from 3M) was attached onto the bonded aluminum frame 24, and an excess portion of the tape was cut off along inner sides of the aluminum frame 24. The phosphor layer 14 was formed to a thickness of about 710 µm on the substrate 12 inside the frame in the same manner as in Example 1.

After formation of the phosphor layer 14, the attached Kapton tape was peeled off, to thereby obtain the substrate 12 having the phosphor layer 14 formed only inside the aluminum frame 24. The difference between heights of the surface of the phosphor layer 14 and the top surface of the aluminum frame 24 was 10 µm or less.

Meanwhile, the same adhesive as that of Example 3 was applied onto the same moisture-proof protective layer 16 as that of Example 1, to thereby form the stimulable phosphor adhesive layer 28 having a thickness of 1.2 μm.

Next, the moisture-proof protective layer 16 was placed on the phosphor layer 14 and the frame 24 such that the stimulable phosphor adhesive layer 28 faced the phosphor layer 14. Heat lamination was carried out in the same manner as in Example 2 and the phosphor layer 14 was sealed to thereby produce the phosphor panel 32 shown in FIG. 4. Heat lamination was carried out 4 times in one direction through a laminating machine.

Example 5

The phosphor panel 32 was produced in the same manner as in Example 4 except that the substrate 12 was preheated to 100° C. before lamination and lamination was carried out once in one direction.

Comparative Examples 5 and 6

The phosphor panel 32 was produced in the same manner as in Example 4 except that the thickness of the stimulable phosphor adhesive layer 28 was changed to 0.4 μm (Comparative Example 5) or 25 μm (Comparative Example 6).

The thickness b of the sealing adhesive layer 18, the sealing width a, and the difference in height between the surface of the phosphor layer 14 and the sealing surface in each obtained phosphor panel was measured as described below.

[Thickness]

(Thickness of sealing adhesive layer 18)

The difference in height between the surface of the substrate 12 without the moisture-proof protective layer 16 and the surface of the moisture-proof protective layer 16 in the vicinity of the substrate 12 was measured using a 3D measuring machine (Non-contact 3D measuring machine, manufactured by Mitutoyo Corporation). Then, the thickness of the moisture-proof protective layer 16 measured in advance was subtracted from the height difference to thereby obtain a value representing the thickness of the sealing adhesive layer 18. The measurement was carried out at 12 points for each sample, and an average value was determined.

(Thickness of stimulable phosphor adhesive layer)

After a selected adhesive was applied onto the surface of the moisture-proof protective layer 16, the total thickness of the moisture-proof protective layer 16 including the stimulable phosphor adhesive layer was measured (thickness meter K351C, manufactured by Anritsu Corporation). The thickness of the moisture-proof protective layer 16 measured in advance was subtracted from the total thickness to thereby obtain a value representing the thickness of the stimulable phosphor adhesive layer. The measurement was carried out at 12 points for each sample of 400 mm×400 mm, and an average value was determined.

[Sealing width]

The width of the sealing portion of each sample was measured using a steel rule (JIS 1st grade) at 12 points, and an average value was determined.

[Difference in Height Between Surface of Phosphor Layer and Sealing Surface]

Before the moisture-proof protective layer 16 was provided, the difference in height between an edge of the surface of the phosphor layer 14 and the sealing surface in the vicinity of the layer 14 was measured at 12 points for each sample using a 3D measuring machine (Non-contact 3D measuring machine, manufactured by Mitutoyo Corporation), and an average value was determined.

Table 1 shows the thickness b of the sealing adhesive layer 18, the sealing width a, the height difference, the conditions for forming the phosphor panel, the materials, and the like of each of Examples and Comparative Examples.

[Table 1]

TABLE 1

| | Peripheral sealing | Sealing adhesive layer | Adhesive layer thickness [μm] | Sealing width [mm] | Height difference [μm] | Phosphor layer/ protective layer | Panel preheating | Number of lamination |
|---|---|---|---|---|---|---|---|---|
| Example 1 | Protective layer/substrate | Epoxy | 7 ± 1 | 5 ± 0.5 | 710 ± 10 | Unbonded | None | None |
| Example 2 | Protective layer/substrate | Epoxy | 7 ± 2 | 5 ± 0.5 | 710 ± 12 | Polyester-based | None | 1 direction × 4 times |
| Example 3 | Protective layer/substrate | Polyester-based | 1.2 ± 0.2 | 5 ± 0.5 | 710 ± 8 | Polyester-based (doubles as sealing adhesive layer) | None | 2 directions × 4 times |
| Example 4 | Protective layer/sealing frame/substrate | Polyester-based | 1.2 ± 0.2 | 5 ± 0.0 | 10 ± 8 | Polyester-based (doubles as sealing adhesive layer) | None | 1 direction × 4 times |
| Example 5 | Protective layer/sealing frame/substrate | Polyester-based | 1.2 ± 0.2 | 5 ± 0.0 | 10 ± 7 | Polyester-based (doubles as sealing adhesive layer) | 100° C. | 1 direction × 1 time |
| Comparative Example 1 | Protective layer/substrate | Epoxy | 25 ± 2 | 5 ± 0.5 | 710 ± 8 | Unbonded | None | None |
| Comparative Example 2 | Protective layer/substrate | Epoxy | 0.4 ± 0.05 | 5 ± 0.5 | 710 ± 12 | Unbonded | None | None |
| Comparative Example 3 | Protective layer/substrate | Epoxy | 7 ± 1 | 1 ± 0.2 | 710 ± 12 | Unbonded | None | None |
| Comparative Example 4 | Protective layer/substrate | Epoxy | 7 ± 1 | 12 ± 0.5 | 710 ± 14 | Unbonded | None | None |
| Comparative | Protective | Polyester- | 0.4 ± 0.05 | 5 ± 0.0 | 10 + 6 | Polyester-based | 100° C. | 1 direction × |

TABLE 1-continued

|  | Peripheral sealing | Sealing adhesive layer | Adhesive layer thickness [μm] | Sealing width [mm] | Height difference [μm] | Phosphor layer/ protective layer | Panel preheating | Number of lamination |
|---|---|---|---|---|---|---|---|---|
| Example 5 | layer/sealing frame/substrate | based |  |  |  | (doubles as sealing adhesive layer) |  | 1 time |
| Comparative Example 6 | Protective layer/sealing frame/substrate | Polyester-based | 25 ± 1 | 5 ± 0.0 | 10 ± 8 | Polyester-based (doubles as sealing adhesive layer) | 100° C. | 1 direction × 1 time |

The moisture permeability and the peeling strength of the sealing portion were measured as described below in each of the various phosphor panels obtained.

[Moisture Permeability of Sealing Portion]

The moisture permeability of the moisture-proof protective layer 16 was measured under the conditions of 40° C. and a relative humidity of 90% using a water vapor permeation analyzer (Model 7000, manufactured by Illinois Instruments, Inc.). The moisture permeability obtained was represented by $\alpha$ (g/m$^2$·day).

The phosphor layer 14 and the adhesive layer (sealing adhesive layer 18, or sealing adhesive layer 18 and stimulable phosphor adhesive layers 22 and 28) were formed on the surface of an aluminum substrate having a size of 450 mm×450 mm and a thickness of 3 mm in the same manner as in Examples and Comparative Examples. The phosphor layer 14 was sealed with the moisture-proof protective layer 16, to thereby prepare a sample for measurement of moisture permeability. The substrate 12 had a small thickness for measuring the moisture permeability through weight change. A substrate having a thickness of 10 mm has a large weight, and it takes a long period of time until the weight increase due to moisture absorption can be measured. However, the moisture absorption is not changed in any way even with a thin substrate.

The weight of the sample was measured (PG2002-2, manufactured by Mettler), and the obtained weight was represented by an initial weight $\beta$(g).

Then, the sample was charged into a thermostatic bath of 40° C. and a relative humidity of 90%, and was left to stand for 100 days. The weight of the sample after 100 days was measured in the same manner as before, and the weight obtained as the weight after the passage of time was represented by $\gamma$(g).

The moisture absorption from the sealing portion was determined through calculation from the weight increase of the sample and the moisture permeability of the moisture-proof protective layer. The moisture absorption from the sealing portion was represented by T(g/day). The moisture absorption from the sealing portion can be represented by the following equation:

$$T = (\gamma - \beta)/100 - (\alpha \times S)$$

in which S(m$^2$) represents an area of the moisture-proof protective layer.

Table 2 shows the results.

[Peeling Strength of Sealing Portion]

An aluminum sheet (width of 10 mm, length of 100 mm, and thickness of 1 mm) formed of the same material as that of the substrate of each Example was prepared. A linear sealing adhesive layer 18 having the same width and the same thickness as those of each Example or Comparative Example was formed, and was attached onto the moisture-proof protective layer 16. Similarly, the moisture-proof protective layer of each Example was attached onto the aluminum sheet through pressing using a pressing mold or through heat lamination in the same manner and under the same conditions as those of each Example. A portion of the moisture-proof protective layer protruding from the aluminum sheet was cut off using a cutter.

An edge (about 10 mm) of the attached moisture-proof protective layer was peeled off, and the peeling strength of the moisture-proof protective layer was measured at 180° C. using a tensile tester (Compact table-top material tester ET TEST, manufactured by Shimadzu Corporation). Table 2 shows the results.

The sensitivity (relative value) of each phosphor panel was evaluated based on the moisture permeability and the peeling strength of the sealing portion. For overall evaluation of the relative sensitivity, 1 refers to "not practical", and 2 refers to "favorable for practical use". Further, 3 represents "particularly favorable for practical use", and 4 represents "optimum level for practical use". Table 2 shows the results of the overall evaluation.

TABLE 2

|  | Number of lamination | Permeation amount in sealing portion [g/day] (size of 45 cm□) | Peeling strength in sealing portion [N/cm] | Overall evaluation |
|---|---|---|---|---|
| Example 1 | None | 0.0002 or less | 2 | 2 |
| Example 2 | 1 direction × 4 times | 0.0002 or less | 2 | 3 |
| Example 3 | 2 directions × 4 times | 0.0002 or less | 1 | 3 |
| Example 4 | 1 direction × 4 times | 0.0002 or less | 1 | 3 |
| Example 5 | 1 direction × 1 time | 0.0002 or less | 1.3 | 4 |
| Comparative Example 1 | None | 0.006 | 2 | 1 |
| Comparative Example 2 | None | — | 0.15 | 1 |
| Comparative Example 3 | None | 0.02 | 2 | 1 |
| Comparative Example 4 | None | 0.0002 or less | 2 | 1 |
| Comparative Example 5 | 1 direction × 1 time | — | 0.3 | 1 |
| Comparative Example 6 | 1 direction × 1 time | 0.004 | 20.5 | 1 |

Table 2 reveals that the phosphor panel of Example 1 has favorable workability and practicality. The phosphor panel of Example 2 has the moisture-proof protective layer 16 and the phosphor layer 14 bonded together, and thus has excellent durability. The phosphor panel of Example 3 has the sealing adhesive layer 18 also serving as an adhesive layer between the moisture-proof protective layer 16 and the phosphor layer 14, and thus has particularly favorable workability. The phosphor panel of Example 4 has a frame and can be formed through heat lamination only in one direction using a laminating machine, and thus has further favorable workability compared with that of the phosphor panel of Example 3. The phosphor panel of Example 5 is formed through heat bonding, and thus has very favorable workability and practicality compared with those of the phosphor panel of Example 4. In other words, the phosphor panels of Examples 1 to 5 in the present invention all have excellent moisture-proof property, strength, and overall evaluation.

Meanwhile, the phosphor panel of Comparative Example 1 has too thick a sealing adhesive layer 18 which results in high moisture permeability. The moisture permeability of the sealing portion becomes the moisture permeability of the moisture-proof protective layer, and thus the phosphor panel of Comparative Example 1 is not practical. The phosphor panel of Comparative Example 2 has too thin a sealing adhesive layer 18 which results in an insufficient sealing adhesive strength, and thus is not practical. The phosphor panel of Comparative Example 3 has too narrow a sealing adhesive layer which results in unfavorable sealing and large moisture permeation, and thus is not practical. The phosphor panel of Comparative Example 4 has good results in moisture permeability of the sealing portion and peeling strength of the sealing portion, but has too large a sealing width which results in a small image pickup surface with respect to the size of the phosphor panel and a large size of the phosphor panel for ensuring an image pickup surface with a required size. Thus, the phosphor panel of Comparative Example 4 is not practical and has an overall evaluation of 1. The phosphor panel of Comparative Example 5 has a thin stimulable phosphor adhesive layer which results in an insufficient sealing adhesive strength and peeling thereof, and thus is not practical. The phosphor panel of Comparative Example 6 has a narrow stimulable phosphor adhesive layer, a large moisture permeability of the sealing portion, and a thick stimulable phosphor adhesive layer at the interface with the phosphor layer. Thus, the sharpness of the image deteriorates and the phosphor panel of Comparative Example 6 is not practical.

What is claimed is:

1. A stimulable phosphor panel comprising:
   a support;
   a stimulable phosphor layer formed on said support through gas phase deposition;
   a moisture-proof protective layer for sealing said stimulable phosphor layer on said support; and
   a sealing adhesive layer for bonding an outer periphery of said moisture-proof protective layer to said support,
   wherein said sealing adhesive layer has a moisture permeability of 1,000 g/m$^2$·day or less as an adhesive after curing, a width of 2 mm to 10 mm, and a thickness of 0.5 µm to 20 µm.

2. The stimulable phosphor panel according to claim 1, wherein said support comprises a substrate on which said stimulable phosphor layer is formed and to which said moisture-proof protective layer is bonded through said sealing adhesive layer.

3. The stimulable phosphor panel according to claim 2, wherein said stimulable phosphor adhesive layer and said sealing adhesive layer are unified.

4. The stimulable phosphor panel according to claim 1, wherein a surface of said stimulable phosphor layer and said moisture-proof protective layer are bonded together through a stimulable phosphor adhesive layer.

5. The stimulable phosphor panel according to claim 1, wherein said support comprises a substrate on which said stimulable phosphor layer is formed and a sealing member which surrounds said stimulable phosphor layer in a surface direction of said substrate and is bonded to said moisture-proof protective layer through said sealing adhesive layer.

6. The stimulable phosphor panel according to claim 5, wherein a difference between heights of said sealing member and said stimulable phosphor layer is 0.1 mm or less.

7. The stimulable phosphor panel according to claim 5, wherein a groove whose shape corresponds to a bottom surface of said sealing member is formed in a surface of said substrate and said sealing member is inserted into said groove.

8. The stimulable phosphor panel according to claim 1, wherein said moisture-proof protective layer comprises a base, a first SiO$_2$ film formed on a surface of said base, a hybrid layer of SiO$_2$ and polyvinyl alcohol formed on said first SiO$_2$ film, and a second SiO$_2$ film formed on said hybrid layer.

9. The stimulable phosphor panel according to claim 1, wherein said stimulable phosphor layer is formed of a stimulable phosphor represented by CsBr:Eu.

10. A method of producing a stimulable phosphor panel comprising:
    forming a stimulable phosphor layer on a support through gas phase deposition;
    forming an adhesive layer so as to have a width in a range of 2 mm to 10 mm and a thickness in a range of 0.5 µm to 20 µm after sealing, by using an adhesive having a moisture permeability of 1,000 g/m$^2$·day or less after curing; and
    bonding a moisture-proof protective layer to said support through said adhesive layer to seal said stimulable phosphor layer formed on said support.

11. The method according to claim 10, wherein said support comprises a substrate, said stimulable phosphor layer is formed on said substrate and said moisture-proof protective layer is bonded to said substrate through said sealing adhesive layer.

12. The method according to claim 11, wherein said adhesive layer is formed on an entire surface of said moisture-proof protective layer.

13. The method according to claim 10, wherein a surface of said stimulable phosphor layer and said moisture-proof protective layer are bonded together while said stimulable phosphor layer is sealed.

14. The method according to claim 10, wherein said support comprises a substrate on which said stimulable phosphor layer is formed and a sealing member which surrounds in an outer periphery of said substrate a region where said stimulable phosphor layer is formed and which is fixed on said substrate prior to forming said stimulable phosphor layer, and said sealing member and said moisture-proof protective layer are bonded together through said adhesive layer to seal said stimulable phosphor layer.

15. The method according to claim 14, wherein a difference between heights of said sealing member and said stimulable phosphor layer is 0.1 mm or less.

16. The method according to claim 14, wherein a groove whose shape corresponds to a bottom surface of said sealing member is formed in a surface of said substrate and said sealing member is inserted into said groove.

17. The method according to claim 10, wherein said stimulable phosphor layer is sealed with said adhesive layer through heat lamination.

18. The method according to claim 17, wherein said adhesive layer is heated in a range of a temperature lower than a softening point of said adhesive layer by 30° C. to 150° C. prior to said heat lamination.

19. The method according to claim 10, wherein said moisture-proof protective layer comprises a base, a first $SiO_2$ film formed on a surface of said base, a hybrid layer of $SiO_2$ and polyvinyl alcohol formed on said first $SiO_2$ film, and a second $SiO_2$ film formed on said hybrid layer.

20. The method according to claim 10, wherein said stimulable phosphor layer is formed of a stimulable phosphor represented by CsBr:Eu.

* * * * *